UNITED STATES PATENT OFFICE.

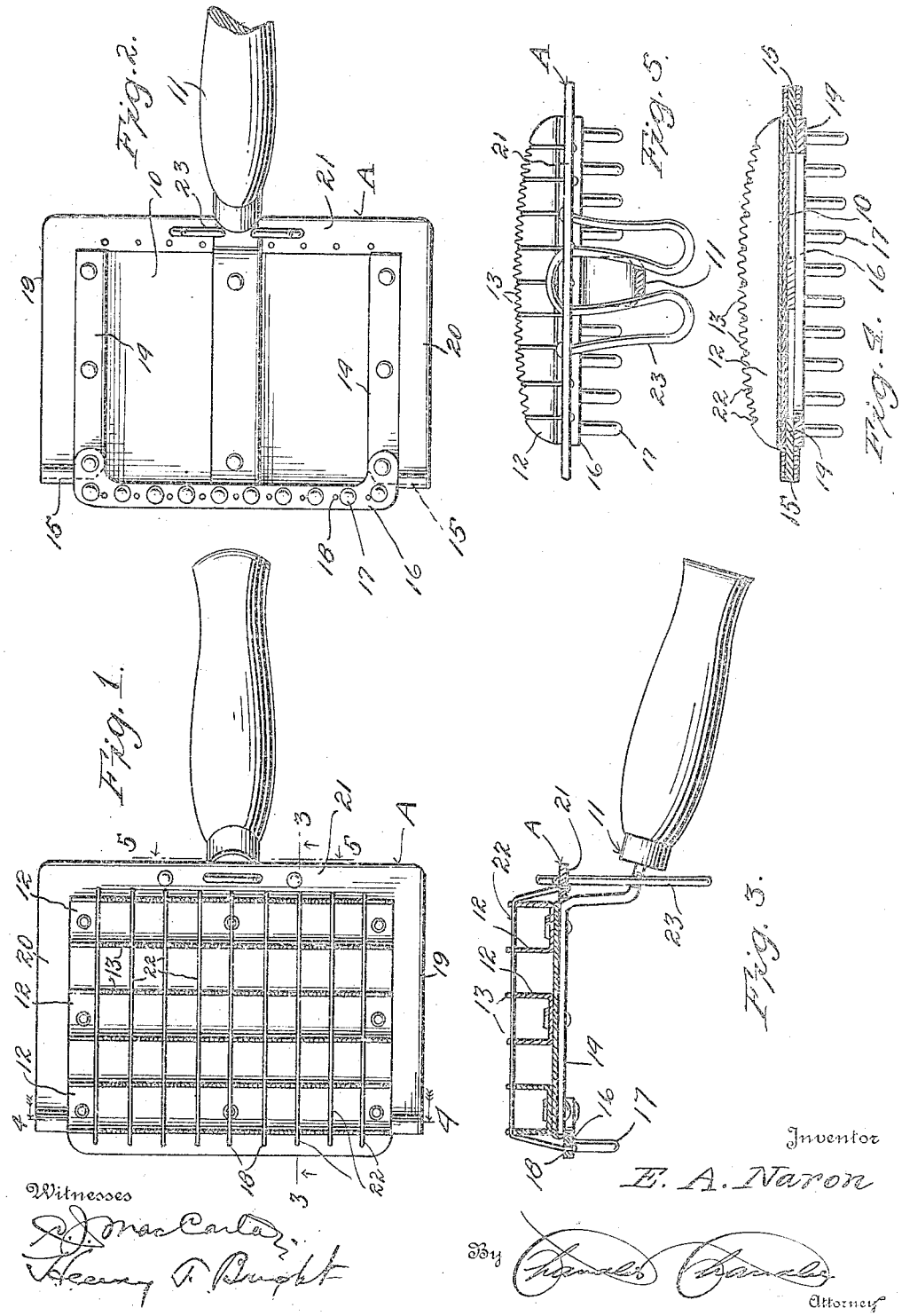

EMILY A. NARON, OF WARREN, ARKANSAS.

CURRYCOMB.

1,253,414.

Specification of Letters Patent.

Patented Jan. 15, 1918.

Application filed November 16, 1914. Serial No. 872,457.

*To all whom it may concern:*

Be it known that I, EMILY A. NARON, a citizen of the United States, residing at Warren, in the county of Bradley, State of Arkansas, have invented certain new and useful Improvements in Currycombs; and I do hereby declare the following to be a full, clear, and exact description of the invention, such as will enable others skilled in the art to which it appertains to make and use the same.

This invention relates to currycombs and particularly those of the self cleaning type.

The object of the invention resides in the provision of a currycomb embodying an improved construction of cleaning mechanism whereby the comb may be cleaned after each use by a single operation.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a bottom view of a currycomb constructed in accordance with the invention;

Fig. 2, a top view of same;

Fig. 3, a section on the line 3—3 of Fig. 1;

Fig. 4, a section on the line 4—4 of Fig. 1, and

Fig. 5, a section on the line 5—5 of Fig. 1.

Referring to the drawings the improved currycomb is shown as comprising a body plate 10 to which is secured a handle 11. Secured against the bottom of the plate 10 are a plurality of members 12 having U-shaped cross sections and the free edges of the arms thereof being provided with teeth 13. Secured to the top of the plate 10 along the side edges thereof are strips 14 the forward ends of which terminate in laterally directed arms 15. Also secured to the top of the plate 10 and extending along the forward edge of said plates is a bar 16 having formed thereon a plurality of teeth 17 and provided with a plurality of openings 18. The cleaning device of the comb comprises a U-shaped member A which includes arms 19 and 20 and an arm connecting portion 21. Secured to the arm connecting portion 21 of the member A are the terminals of a plurality of cleaning wires 22, the other terminals of said wires being engaged through respective openings 18 and secured to the bar 16. The free end of the arms 19 and 20 of the member A are rotatably engaged with the arms 15 so that the arm connecting portion 21 of said member can be swung toward the handle 11 and the wires 22 engaged between the teeth 13 as shown in Fig. 3. The member A is adapted to be held in the position shown in Fig. 3 during the use of the brush by means of a spring clip 23 carried by the arm connecting portion 21 and adapted to engage over the handle 11.

With the parts in the position shown in Fig. 3 it will be obvious that the brush can be used as desired. To clean the brush it is only necessary to force the clip 23 out of engagement with the handle 11 and then swing the arm connecting portion 21 of the member A away from the handle when the wires 22 will move from between the teeth 13 and eject material confined between the teeth.

What is claimed is:—

In a currycomb, a body plate, a plurality of members secured in parallel relation upon said plate, each member being of U-shape in cross section and having saw toothed free edges, pivots projecting laterally from the plate at one longer edge, a U-shaped frame having its ends swingingly embracing the pivots, a series of spaced wires having their ends connected to the plate and frame at remote points with respect to each other to be drawn taut in bridging relation to the members crosswise thereof, when the frame is brought in substantially the same plane with the plate, and slackening said wires on the swinging of the frame away from said plate, and means for holding the frame in position substantially in the plane with the plate.

In testimony whereof I affix my signature in the presence of two witnesses.

EMILY A. NARON.

Witnesses:
W. C. WILLIAMS,
A. C. SHUMMAN.

Copies of this patent may be obtained for five cents each, by addressing the "Commissioner of Patents, Washington, D. C."